United States Patent Office 3,166,565
Patented Jan. 19, 1965

3,166,565
O-(ISOXAZOLYL) O-ALKYL PHOSPHORAMIDATES AND PHOSPHORAMIDOTHIOATES
Raymond H. Rigterink, Midland, Mich., assignor to The Dow Chemical Company, Midland, Mich., a corporation of Delaware
No Drawing. Filed June 14, 1961, Ser. No. 116,955
6 Claims. (Cl. 260—307)

The present invention is directed to the phosphoramidates and phosphoramidothioates corresponding to the formula

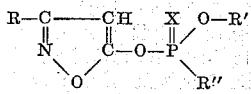

In this and succeeding formulae, R represents phenyl, halophenyl, nitrophenyl, lower alkylphenyl and lower alkoxyphenyl, R' represents lower alkyl, R" represents amino or lower alkylamino and X represents oxygen or sulfur. In the present specification and claims, the expressions "lower alkyl" and "lower alkoxy" are employed to refer to the radicals containing from 1 to 5 carbon atoms, inclusive. These compounds are liquid or crystalline materials which are somewhat soluble in many common organic solvents and of very low solubility in water. The compounds are useful as parasiticides and herbicides and are adapted to be employed for the control of many plants, mites, insects and bacterial and fungal organisms such as aphids, beetles, ticks, screw worms, ascarids, helminths, and Cabomba.

The novel compounds of the present invention may be prepared by several methods. In a preferred method, the compounds are prepared by reacting an O-lower alkyl phosphoramidochloridate or phosphoramidochloridothioate corresponding to the formula

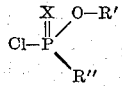

with an alkali metal salt of an isoxazole compound corresponding to the formula

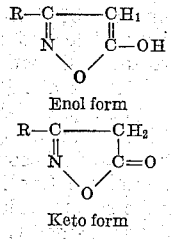

The reaction conveniently is carried out in an inert organic liquid such as dimethyl formamide, ethyl acetate, benzene, toluene, chloroform, or acetone. The amounts of the reagents to be employed are not critical, some of the desired products being obtained when employing any proportion of the reagents. In the preferred method of operation, good results are obtained when employing substantially equimolecular proportions of the alkali metal salt of the isoxazole compound and the phosphoramidochloridate or phosphoramidochloridothioate. The reaction takes place smoothly at the temperature range of from 10° to 100° C. with the production of the desired product and alkali metal chloride byproduct.

In carrying out the reaction, the reactants are mixed and contacted together in any convenient fashion and the resulting mixture maintained for a period of time in the reaction temperature range to insure completion of the reaction. Following the reaction, the reaction mixture is washed with water and any reaction medium removed by fractional distillation under reduced pressure to obtain the desired product as a residue. This product may be further purified by conventional procedures such as washing with dilute aqueous alkali metal hydroxide and washing with water, solvent extraction, and recrystallization.

In an alternative procedure, the new compounds are prepared by reacting an O-lower alkyl phosphorodichloridate or O-lower alkyl phosphorodichloridothioate having the structure

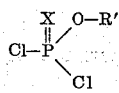

with an alkali metal salt of the isoxazole compound as previously defined to produce an intermediate diester phosphorochloridate or phosphorochloridothioate having the structure

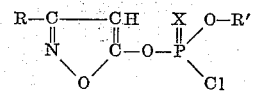

This intermediate is thereafter reacted with ammonia or a lower alkylamine to produce the desired phosphoramidate or phosphoramidothioate product. The reaction is somewhat exothermic and conveniently is carried out in a reaction medium such as benzene, chloroform, toluene or dimethyl formamide. Good results are obtained when employing substantially equimolecular proportions of the O-lower alkyl phosphorodichloridate or phosphorodichloridothioate and alkali metal salt compound and at least two molecular proportions of ammonia or alkylamine. The reaction with the alkali metal salt of the isoxazole compound is carried out at temperatures of from −40° to 70° C. The reaction between the phosphorochloridate or phosphorochloridothioate intermediate and ammonia or lower alkylamine takes place smoothly at the temperature range of from −10° to 30° C. The temperature may be controlled by regulating the rate of mixing and contacting the reactants together and by external cooling. The byproduct in both steps of the reaction is chloride. In the first step, the chloride appears as an alkali metal chloride. In the second step, the chloride appears as the hydrochloride salt of the amine or ammonia reactants. Following the reaction, the desired product may be separated in accordance with conventional procedures as previously described.

The following examples merely illustrate the invention and are not to be construed as limiting:

EXAMPLE 1

O-(3-phenyl-5-isoxazolyl) O-methyl N-isobutyl phosphoramidothioate 3-phenyl-2-isoxazolin-5-one (16.1 grams; 0.1 mole), aqueous 50 percent sodium hydroxide (equivalent to 0.1 mole of NaOH), 10 milliliters of water and 150 milliliters of benzene were mixed together and heated at the boiling temperature to prepare the sodium salt of the 3-phenyl-5-isoxazolol. The heating was carried out with the distillation of some of the reaction medium together with the water of reaction as formed. This solvent mixture was then diluted with 50 milliliters of dimethylformamide and O-methyl N-isobutyl phosphoramidochloridothioate (20.2 grams; 0.1 mole) added rapidly with stirring and at a temperature of from 23 to 26° C. Stirring was thereafter continued and the temperature of the mixture raised to and maintained at from 60° to 65° C. for two hours to insure completion of the reaction. The reaction mixture was then washed with water and low boiling constituents removed from the washed mixture by distillation under reduced pressure to obtain an O-(3-phenyl-5-isoxazolyl) O-methyl N-isobutyl phosphoramidothioate product as a liquid residue. This product had a refractive index $n/D$ of 1.5366 at 25° C., and a sulfur content of 9.88 percent as compared to a theoretical content of 9.82 percent.

EXAMPLE 2

*O-(3-phenyl-5-isoxazolyl) O-methyl N-isopropyl phosphoramidate*

3-phenyl-2-isoxazolin-5-one (16.1 grams; 0.1 mole), 4.0 grams (0.1 mole) of sodium hydroxide and 250 milliliters of isobutyl methyl ketone were mixed together and heated at the boiling temperature with stirring to produce the sodium salt of 3-phenyl-5-isoxazolol. 14.9 grams (0.1 mole) of O-methyl phosphorodichloridate was added rapidly to the above mixtures containing the salt with stirring. The addition was carried out over a period of 5 minutes and at a temperature of about −40° C. Stirring was thereafter continued for one hour as the temperature of the reaction mixture was allowed to rise to about 0° C. To this mixture containing the intermediate phosphorochloridate product was added portionwise 11.8 grams (0.2 mole) of isopropylamine. The addition was carried out in about 5 minutes and at a temperature of from −5° to 0° C. Following the addition, stirring was continued for two hours as the temperature of the mixture came to room temperature. The reaction mixture was then filtered and low boiling constituents removed from the filtrate by fractional distillation under reduced pressure to obtain an O-(3-phenyl-5-isoxazolyl) O-methyl N-isopropyl phosphoramidate product as a liquid residue having a refractive index $n/D$ of 1.5202 at 25° C.

EXAMPLE 3

*O-[3-(o-methoxyphenyl)-5-isoxazolyl] O-ethyl N-ethyl phosphoramidate*

3-(o-methoxyphenyl)-2-isoxazolin-5-one (4.8 grams; 0.025 mole), 0.025 mole of sodium hydroxide and 150 milliliters of isobutyl methyl ketone were mixed together and heated at the boiling temperature in the manner as previously described to prepare the sodium salt of 3-(o-methoxyphenyl)-5-isoxazolol. O-ethyl phosphorodichloridate (4.1 grams; 0.025 mole) was added rapidly with stirring and at a temperature of about −40° C. to the above mixture containing the salt product. Stirring was thereafter continued for one hour to insure the completion of the reaction and the production of the O-[3-(o-methoxyphenyl)-5-isoxazolyl] O-ethyl phosphorochloridate intermediate. Ethylamine (2.3 grams; 0.05 mole) was then added with stirring to the above mixture containing the phosphorochloridothioate intermediate. The addition was carried out over a period of about 30 minutes and at a temperature of from −10° to 0° C. with stirring being continued for one hour to insure completion of the reaction. The reaction mixture was then filtered and low boiling constituents removed from the filtrate by vacuum distillation to obtain an O-[3-(o-methoxyphenyl)-5-isoxazolyl] O-ethyl N-ethyl phosphoramidate product as a liquid residue having a refractive index $n/D$ of 1.4946 at 25° C.

EXAMPLE 4

*O-[3-(p-chlorophenyl)-5-isoxazolyl] O-ethyl N-ethyl phosphoramidate*

3-(p-chlorophenyl)-2-isoxazolin-5-one (19.6 grams; 0.1 mole), 0.1 mole of sodium hydroxide and 200 milliliters of isobutyl methyl ketone were mixed together and heated at the boiling temperature as previously described to prepare the sodium salt of 3-(p-chlorophenyl)-5-isoxazolol. O-ethyl phosphorodichloridate (14.9 grams; 0.1 mole) was added rapidly with stirring to the above mixture containing the sodium salt compound. The addition was carried out at a temperature of −40° C. and over a period of about 5 minutes. Stirring was thereafter continued for one hour as the temperature of the reaction mixture was allowed to rise to about 0° C. To this mixture was then added with stirring 9.0 grams (0.2 mole) of ethylamine. The addition was carried out in about 30 minutes and at a temperature of from −10° to 0° C. Stirring was thereafter continued for one hour as the temperature was allowed to rise to room temperature to complete the reaction. The reaction mixture was then filtered and the reaction medium removed from the filtrate by fractional distillation under reduced pressure to obtain an O-[3-(p-chlorophenyl)-5-isoxazolyl] O-ethyl N-ethyl phosphoramidate product as a crystalline solid residue. This product was recrystallized from carbon tetrachloride and found to melt at 108°–110° C.

In a similar manner, other products of the present invention are prepared as follows:

O-(3-phenyl-5-isoxazolyl) O-methyl N-isopropyl phosphoramidothioate ($n/D$ of 1.5492 at 25° C.) by reacting together the sodium salt of 3-phenyl-5-isoxazolol, O-methyl phosphorodichloridothioate and isopropylamine.

O-(3-phenyl-5-isoxazolyl) O-isobutyl N-methyl phosphoramidothioate ($n/D$ of 1.5387 at 25° C.) by reacting together the potassium salt of 3-phenyl-5-isoxazolol and O-isobutyl N-methyl phosphoramidochloridothioate.

O-(3-phenyl-5-isoxazolyl) O-methyl N-methyl phosphoramidate ($n/D$ of 1.5213 at 25° C.) by reacting together the potassium salt of 3-phenyl-5-isoxazolol and O-methyl N-methyl phosphoramidochloridate.

O-[3-(p-nitrophenyl)-5-isoxazolyl] O-isopropyl N-diamyl phosphoramidothioate (molecular weight of 469) by reacting together the sodium salt of 3-(p-nitrophenyl)-5-isoxazolol and O-isopropyl N-diamyl phosphoramidochloridothioate.

O-[3-(2′,4′-dimethoxyphenyl)-5-isoxazolyl] O-propyl N-dimethyl phosphoramidothioate (molecular weight of 386) by reacting together the sodium salt of 3-(2′,4′-dimethoxyphenyl)-5-isoxazolol and O-propyl N-dimethyl phosphoramidochloridothioate.

O-[3-p-amylphenyl)-5-isoxazolyl] O-methyl N-methyl phosphoramidothioate (molecular weight of 338) by reacting together the sodium salt of 3-(p-amylphenyl)-5-isoxazolol and O-methyl N-methyl phosphoramidochloridate.

O-[3-(pentachlorophenyl)-5-isoxazolyl]-O-amyl N-butyl phosphoramidate (molecular weight of 556) by reacting together the sodium salt of 3-pentachlorophenyl-5-isoxazolol, O-amyl phosphorodichloridate and butylamine.

O-(3-phenyl-5-isoxazolyl) O-methyl N-propyl phosphoramidate ($n/D$ of 1.5011 at 25° C.) by reacting together the potassium salt of 3-phenyl-5-isoxazolol, O-methyl phosphorodichloridate and propylamine.

O-(3-phenyl-5-isoxazolyl) O-methyl N-sec. butyl phosphoramidate ($n/D$ of 1.5122 at 25° C.) by reacting together the sodium salt of 3-phenyl-5-isoxazolol, O-isobutyl phosphorodichloridate and methylamine.

O-[3-(3′,4′-dibromophenyl)-5-isoxazolyl] O-methyl N-methyl phosphoramidothioate (molecular weight of 441) by reacting together the sodium salt of 3-(2′,4′-dibromophenyl)-5-isoxazolol and O-methyl N-methyl phosphoramidochloridothioate.

O-[3-(2′,4′-dimethylphenyl)-5-isoxazolyl] O-methyl phosphoramidate (molecular weight of 282) by reacting together the sodium salt of 3-(2′,4′-dimethylphenyl)-5-isoxazolol and O-methyl phosphoramidochloridate.

O-[3-(2′,4′,5′-trichlorophenyl)-5-isoxazolyl] O-sec. butyl N-methyl phosphoramidothioate (molecular weight of 429) by reacting together the sodium salt of 3-(2′,4′,5′-trichlorophenyl)-5-isoxazolol and O-sec. butyl N-methyl phosphoramidochloridothioate.

O-(3-phenyl-5-isoxazolyl) O-methyl N-diethyl phosphoramidate ($n/D$ of 1.5102 at 25° C.) by reacting together the sodium salt of 3-phenyl-5-isoxazolol and O-methyl N-diethyl phosphoramidochloridate.

O-(3-phenyl-5-isoxazolyl) O-ethyl N-ethyl phosphoramidate ($n/D$ of 1.5035 at 25° C.) by reacting together the sodium salt of 3-phenyl-5-isoxazolol, O-ethyl phosphordichloridate and ethylamine.

O-(3-phenyl-5-isoxazolyl) N-methyl O-isopropyl phosphoramidate (n/D of 1.5152 at 25° C.) by reacting together the potassium salt of 3-phenyl-5-isoxazolol, O-isopropyl phosphoramidate and methylamine.

The new compounds of the present invention are useful as herbicides and parasiticides for the control of a number of plant and parasite species. For such use, the products are dispersed on a finely divided solid and employed as dusts. Also, such mixtures may be dispersed in water with or without the aid of a surface active dispersing agent and the resulting aqueous suspensions employed as sprays. In other procedures, the products are employed as toxic constituents in solvent solutions, oil-in-water or water-in-oil emulsions or aqueous dispersions. In representative operations, aqueous compositions containing 100 parts per million by weight of O-(3-phenyl-5-isoxazolyl) O-methyl N-isobutyl phosphoramidothioate give 100 percent controls of mites and plum curculio.

The isoxazole compounds employed as starting materials in accordance with the present teachings may be prepared in known methods wherein a lower alkyl ester of benzoylacetate or a suitable substituted benzoylacetate is reacted with hydroxylamine. Representative acetates include the lower alkyl esters of nitrobenzoylacetate, lower alkylbenzoylacetate, lower alkoxybenzoylacetate, chlorobenzoylacetate and bromobenzoylacetate, such as trimethoxybenzoylacetate, dinitrobenzoylacetate, tribromobenzoylacetate, trimethylbenzoylacetate, ethoxybenzoylacetate, propylbenzoylacetate, etc. Upon completion of the reaction, the desired isoxazole compound may be separated in conventional methods.

I claim:
1. A compound of the formula

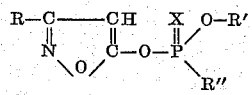

wherein R is a member of the group consisting of phenyl, halophenyl, nitrophenyl, lower alkylphenyl and lower alkoxyphenyl, R' is lower alkyl, R" is a member of the group consisting of amino and lower alkylamino and X is a member of the group consisting of oxygen and sulfur.

2. O-(3-phenyl-5-isoxazolyl) O-methyl N-isobutyl phosphoramidothioate.
3. O-(3-phenyl-5-isoxazolyl) O-methyl N-isopropyl phosphoramidate.
4. O-(3-phenyl-5-isoxazolyl) O-methyl N-isopropyl phosphoramidothioate.
5. O-(3-phenyl-5-isoxazolyl) O-ethyl N-ethyl phosphoramidate.
6. O-(3-phenyl-5-isoxazolyl) O-isopropyl N-methyl phosphoramidate.

References Cited in the file of this patent
UNITED STATES PATENTS

| | | |
|---|---|---|
| 2,751,384 | Coover et al. | June 19, 1956 |
| 2,814,636 | Stahmann et al. | Nov. 26, 1957 |
| 2,848,475 | Schmidt | Aug. 19, 1958 |
| 2,861,912 | Sallman | Nov. 25, 1958 |
| 2,881,201 | Schrader | Apr. 7, 1959 |

FOREIGN PATENTS

| | | |
|---|---|---|
| 713,278 | Great Britain | Aug. 11, 1954 |

OTHER REFERENCES

Hackh's Chemical Dictionary (Philadelphia, 1944), page 54.

Burger: Medicinal Chemistry (New York, 1950), page 75.